Reissued Dec. 2, 1947

Re. 22,944

UNITED STATES PATENT OFFICE 22,944

NITRO DERIVATIVE OF TERTIARY BUTYL HEMIMELLITENE AND PROCESS FOR PREPARING SAME

Marion Scott Carpenter, Nutley, N. J., assignor to Givaudan-Delawanna, Inc., New York, N. Y., a corporation of New Jersey No Drawing. Original No. 2,072,293, dated March 2, 1937, Serial No. 55,848, December 23, 1935. Application for reissue June 24, 1947, Serial No. 756,798

5 Claims. (Cl. 260—645)

This invention relates to a nitro derivative of tertiary butyl hemimellitene and to a process for its manufacture.

It is known that one of the nitro groups in musk xylene

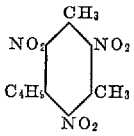

can be replaced by $COCH_3$, CN, CHO, $N_3$ or halogen without destroying the characteristic musk-like odor of the product. Prior to my discovery, however, it was not realized that one of the nitro groups in the above structural formula could be replaced by the methyl group to yield a product possessing a musk-like odor.

I have found that by nitrating tert-butyl hemimellitene, which was hitherto unknown, and the preparation of which is disclosed and claimed in my copending application, Serial No. 756,797, filed June 24, 1947, for the reissue of U. S. Patent No. 2,144,615, issued on application Serial No. 55,847, filed December 23, 1935, there is obtained a crystalline dinitro derivative having a musk-like odor. Its structural formula is

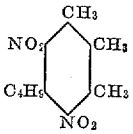

The tertiary butyl hemimellitene employed in the present process may be prepared according to any of the fololwing examples taken from my aforesaid application Serial No. 55,847:

*Example 1*

65 g. tert-butyl chloride is added, with constant agitation, to a suspension of 5 g. anhydrous aluminum or ferric chloride in 300 g. pseudocumene at a temperature of about 5–10° C. When the reaction has subsided, the mixture is washed with water until free of acid and inorganic salts. The excess pseudocumene is distilled off and the remaining tert-butyl hemimellitene distilled in vacuo, the fraction boiling at 92° C. under a vacuum of 3.5 mm. being collected. By working at a higher temperature the iron or aluminum chloride may be replaced by tin or titanium tetrachloride.

*Example 2*

To 1380 g. sulfuric acid 93%, previously cooled to −10° C., there is added with efficient agitation a solution of 120 g. tert-butyl alcohol in 410 g. pseudocumene, maintaining the temperature between −10° and 0° C. The reaction mixture is poured onto ice and the oil which separates is washed free of acid and distilled as in Example 1.

*Example 3*

1750 g. 1,3-dimethyl-5-tert-butyl benzene, hereafter referred to as butyl xylene, 108 g. paraformaldehyde (or an equivalent quantity of commercial 37% formaldehyde solution) and 650 g. 31% hydrochloric acid are mixed and warmed to 50° C. Then with constant agitation there are added 1200 g. 82% sulfuric acid. After 5–6 hours agitation at 50–70° C. the formaldehyde is consumed and the reaction mixture is cooled. The acid layer is discarded, the oily layer is washed with water until free of acid and distilled, preferably in vacuo. The excess butyl xylene distills over first then, under a vacuum of 4 mm. of mercury, there is collected the desired 2,6-dimethyl-4-tert-butyl benzyl chloride boiling at 117–120° C. It soon congeals to colorless, massive rhombs melting at about 26–27° C. The specific gravity at 25° C. of the super-cooled liquid is about 1.0030–1.0040. For the dechlorination of the 2,6-dimethyl-4-tert-butyl benzyl chloride it is not necessary that it be distilled from the excess butyl xylene; the crude product obtained from the above reaction may be submitted directly to the dechlorination process, although I prefer to remove the butyl xylene first. 355 g. zinc dust are covered with 500 g. water and the suspension heated to 100° C. Then, with vigorous agitation there are introduced simultaneously the 2,6-dimethyl-4-tert-butyl benzyl chloride produced in the first step (either distilled or in the crude form containing butyl xylene) and 855 g. 18% sodium hydroxide solution. Stirring and refluxing are continued until the oily layer is free of chlorine. The oil is driven over with steam (or separated by decantation from the zinc slime) and redistilled as in Example 1.

For the nitration of the tert-butyl hemimellitene produced, for example, as described above I may use the commercial grade of nitric acid analyzing 96–98% either with or without the addition of the commonly employed water removing agents such as sulfuric acid and acetic anhydride.

The following example indicates in a general way the manner in which my invention may be put into practice, with the understanding that I do not limit myself to the specific quantities and conditions herein described:

To a mixture of 88 kgs. nitric acid 97% and 264 kgs. sulfuric acid 93% there is added with efficient agitation 41 kgs. tert-butyl hemimellitene at a temperature of 20–35° C. The reaction mixture is poured onto crushed ice, the resulting crystals are filtered, taken up in benzene and the solution washed free of acid with an alkaline solution. The benzene is distilled off and the remaining crystals are recrystallized from alcohol. The resulting dinitro tert-butyl hemimellitene appears in the form of pale yellow glistening rods melting at 136–136.5° C. and having a musk-like odor.

The invention claimed is:

1. 2,6-dinitro-3,4,5-trimethyl 1-tert-butyl benzene, comprising yellow crystals of M. P. 136–136.5° C. and having a musk-like odor.

2. Process of preparing a dinitro derivative of tert-butyl hemimellitene which comprises nitrating tert-butyl hemimellitene.

3. Process of preparing a dinitro derivative of tert-butyl hemimellitene which comprises reacting nitric acid with tert-butyl hemimellitene and crystallizing the reaction mixture.

4. Process of preparing a dinitro derivative of tert-butyl hemimellitene which comprises reacting nitric acid with tert-butyl hemimellitene, crystallizing the reaction mixture, dissolving the resulting crystals in benzene and washing the solution free of acid, distilling off the benzene and recrystallizing the product.

5. Process of preparing a dinitro derivative of tert-butyl hemimellitene which comprises reacting nitric acid with tert-butyl hemimellitene at a temperature of 20–35° C., crystallizing the reaction mixture by pouring on ice, dissolving the resulting crystals in benzene and washing the solution free of acid, distilling off the benzene and recrystallizing the product.

MARION SCOTT CARPENTER.

REFERENCES CITED

The following references are of record in the file of this patent:

Fuson et al., "J. Am. Chem. Soc.," vol. 63, 1941, pages 2652–2653.

Darzens et al., "Comptes Rendus Acad. Sci.," vol. 99 (1934), pages 959 to 962.